(12) United States Patent
Nakayama et al.

(10) Patent No.: US 10,471,686 B2
(45) Date of Patent: Nov. 12, 2019

(54) INTERLAYER FILM FOR LAMINATED GLASS, AND LAMINATED GLASS

(71) Applicant: SEKISUI CHEMICAL CO., LTD., Osaka (JP)

(72) Inventors: Kazuhiko Nakayama, Shiga (JP); Hiroaki Inui, Roermond (NL); Hirofumi Kitano, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 227 days.

(21) Appl. No.: 15/322,793

(22) PCT Filed: Sep. 30, 2015

(86) PCT No.: PCT/JP2015/077856
§ 371 (c)(1),
(2) Date: Dec. 29, 2016

(87) PCT Pub. No.: WO2016/052666
PCT Pub. Date: Apr. 7, 2016

(65) Prior Publication Data
US 2017/0157898 A1    Jun. 8, 2017

(30) Foreign Application Priority Data

Sep. 30, 2014   (JP) ................. 2014-202339

(51) Int. Cl.
| | | |
|---|---|---|
| B32B 15/04 | (2006.01) | |
| B32B 17/06 | (2006.01) | |
| B32B 17/10 | (2006.01) | |
| B32B 27/30 | (2006.01) | |
| B60J 1/02 | (2006.01) | |
| B32B 7/04 | (2019.01) | |
| B32B 27/06 | (2006.01) | |
| B32B 27/08 | (2006.01) | |
| B32B 27/22 | (2006.01) | |
| B32B 27/28 | (2006.01) | |
| B32B 27/32 | (2006.01) | |
| B32B 27/34 | (2006.01) | |
| B32B 27/36 | (2006.01) | |
| B32B 3/30 | (2006.01) | |

(52) U.S. Cl.
CPC ............ *B32B 17/1055* (2013.01); *B32B 3/30* (2013.01); *B32B 7/04* (2013.01); *B32B 17/064* (2013.01); *B32B 17/10* (2013.01); *B32B 17/10587* (2013.01); *B32B 17/10596* (2013.01); *B32B 17/10761* (2013.01); *B32B 17/10972* (2013.01); *B32B 27/06* (2013.01); *B32B 27/08* (2013.01); *B32B 27/22* (2013.01); *B32B 27/28* (2013.01); *B32B 27/285* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B60J 1/02* (2013.01); *B32B 2250/03* (2013.01); *B32B 2250/40* (2013.01); *B32B 2307/102* (2013.01); *B32B 2307/406* (2013.01); *B32B 2307/412* (2013.01); *B32B 2307/538* (2013.01); *B32B 2329/06* (2013.01); *B32B 2605/006* (2013.01); *B32B 2605/08* (2013.01)

(58) Field of Classification Search
USPC .................................... 428/426, 688
See application file for complete search history.

(56) References Cited

U.S. PATENT DOCUMENTS

| | | | |
|---|---|---|---|
| 6,093,471 | A | 7/2000 | Hopfe et al. |
| 7,678,441 | B2 | 3/2010 | Smith |
| 2015/0174862 | A1 | 6/2015 | Kitano et al. |

FOREIGN PATENT DOCUMENTS

| | | |
|---|---|---|
| BY | 8073 | 6/2006 |
| CA | 2 388 107 | 5/2001 |
| EP | 1 233 007 | 8/2002 |
| EP | 3 029 000 | 6/2016 |
| EP | 3 029 001 | 6/2016 |
| EP | 3 029 002 | 6/2016 |
| EP | 3 029 003 | 6/2016 |
| EP | 3 127 884 | 2/2017 |
| EP | 3 130 568 | 2/2017 |
| EP | 3 130 569 | 2/2017 |
| EP | 3 162 536 | 5/2017 |
| EP | 3 202 735 | 8/2017 |
| EP | 3 202 738 | 8/2017 |
| JP | 9-295839 | 11/1997 |
| JP | 2001-48599 | 2/2001 |
| JP | 2002-37648 | 2/2002 |
| JP | 2002-104846 | 4/2002 |
| WO | 2014/021459 | 2/2014 |

OTHER PUBLICATIONS

JP2002104846 Englsih translation.*
Extended European Search Report dated Mar. 15, 2018 in European Application No. 15845698.8.
International Search Report dated Dec. 22, 2015 in corresponding International (PCT) Application No. PCT/JP2015/077856.

* cited by examiner

*Primary Examiner* — Lauren R Colgan
(74) *Attorney, Agent, or Firm* — Wenderoth, Lind & Ponack, L.L.P.

(57) ABSTRACT

The present invention aims to provide an interlayer film for a laminated glass capable of exhibiting high deaeration properties even in a nip roll method and hardly forming air bubbles to enable the production of a highly visible laminated glass, and a laminated glass including the interlayer film for a laminated glass. The present invention relates to an interlayer film for a laminated glass, having a large number of recesses and a large number of projections on at least one surface, the recesses each having a groove shape with a continuous bottom and being regularly adjacent to each other in parallel with one another, the recesses each having a groove shape with a continuous bottom having a ratio (R/Sm×100) of a radius of rotation R of the bottom to an interval Sm between the recesses of 15% or higher.

8 Claims, No Drawings

INTERLAYER FILM FOR LAMINATED GLASS, AND LAMINATED GLASS

TECHNICAL FIELD

The present invention provides an interlayer film for a laminated glass capable of exhibiting high deaeration properties even in a nip roll method and hardly forming air bubbles to enable the production of a highly visible laminated glass, and also provides a laminated glass including the interlayer film for a laminated glass.

BACKGROUND ART

A laminated glass including two glass plates integrated through an interlayer film for a laminated glass containing a thermoplastic resin such as plasticized polyvinyl butyral is widely used for automotive windshields.

Such automotive windshields are produced, for example, by a vacuum deaeration method.

In the vacuum deaeration method, an interlayer film for a laminated glass is sandwiched between at least two glass plates to give a laminate. The laminate is placed in a rubber bag and vacuum suctioned for removal of air remaining between the glass plates and the interlayer film so as to be preliminarily pressure bonded. Then, the laminate is pressurized with heat, for example, in an autoclave for final pressure bonding to provide an automotive windshield.

In the process for producing a laminated glass by the vacuum deaeration method, deaeration properties upon stacking a glass plate and an interlayer film for a laminated glass on top of each other are important. The interlayer film for a laminated glass therefore commonly has minute projections and recesses formed on at least one surface for the purpose of ensuring the deaeration properties in production of a laminated glass. In particular, when recesses, among the projections and recesses, each have a groove shape with a continuous bottom (shape of an engraved line) and such recesses in the shape of engraved lines are regularly formed side by side in parallel with one another, excellent deaeration properties can be exhibited (see, Patent Literature 1).

An exemplary method for producing a laminated glass is a nip roll method. In the nip roll method, a laminate including at least two glass plates and an interlayer film for a laminated glass interposed between the glass plates is carried on a conveyor through a heating zone to be heated to a certain temperature, and then passed between nip rolls to be pressure bonded under heating, while the glass plates and the interlayer film are squeezed for reduction of air remaining therebetween. The glass and the interlayer film for a laminated glass were thus closely bonded.

When an interlayer film for a laminated glass conventionally used in production of a laminated glass by the vacuum deaeration method is used in production of a laminated glass by the nip roll method, deaeration of the resulting laminated glass may be insufficient.

CITATION LIST

Patent Literature

Patent Literature 1: JP 2001-48599 A

SUMMARY OF INVENTION

Technical Problem

The present inventors investigated the cause of insufficient deaeration of a laminated glass when the laminated glass is produced by the nip roll method, and find out that recesses having a groove shape with a continuous bottom (hereafter, also referred to as "recesses in the shape of engraved lines") formed on the surface of the interlayer film for a laminated glass for facilitating deaeration cause the problem. In the vacuum deaeration method, decompression and heating are performed at the same time for preliminary pressure bonding, and air inside the recesses in the shape of engraved lines is removed by the decompression. In such a case, the presence of uncrushed recesses in the resulting laminated glass hardly causes a problem. In the nip roll method, however, since the film and the glass plate are pressure bonded only by pressure in the preliminary pressure bonding, recesses may not be crushed to remain after the preliminary pressure bonding. In the cases where the amount of air remaining in the uncrushed recesses is large, air bubbles may remain in the film even after the pressure bonding under heating in an autoclave, possibly lowering the visibility. Especially in the cases where the temperature of the laminated glass precursor upon preliminary pressure bonding is low, the recesses are less likely to be crushed, and air bubbles tend to remain.

The present invention aims to provide an interlayer film for a laminated glass which can exhibit high deaeration properties even in the nip roll method and hardly forms air bubbles to enable the production of a highly visible laminated glass, and also to provide a laminated glass including the interlayer film for a laminated glass. The interlayer film for a laminated glass of the present invention may be used not only in the nip roll method but also in the vacuum deaeration method.

Solution to Problem

The present invention relates to an interlayer film for a laminated glass, having a large number of recesses and a large number of projections on at least one surface, the recesses each having a groove shape with a continuous bottom and being regularly adjacent to each other in parallel with one another, the recesses each having a groove shape with a continuous bottom having a ratio (R/Sm×100) of a radius of rotation R of the bottom to an interval Sm between the recesses of 15% or higher.

The state "having a large number of recesses and a large number of projections on at least one surface" as used herein also means the state "having a large number of recesses and a large number of projections formed on at least one surface". The state "the recesses each having a groove shape with a continuous bottom and being regularly adjacent to each other in parallel with one another" also means the state where "the recesses each have a groove shape with a continuous bottom and adjacent recesses are regularly formed in parallel with one another".

The present invention is specifically described in the following.

As a result of intensive studies, the present inventors found out that, when having projections and recesses in specific shapes on its surface, an interlayer film for a laminated glass can exhibit high deaeration properties even in the nip roll method and enables the production of a highly visible laminated glass. The present invention was thus completed. The interlayer film for a laminated glass according to the present invention may be used not only in the nip roll method but also in the vacuum deaeration method.

The interlayer film for a laminated glass of the present invention has a large number of recesses and a large number of projections on at least one surface and the recesses each have a groove shape with a continuous bottom and are regularly adjacent to each other in parallel with one another. Due to this structure, deaeration properties in production of a laminated glass by the nip roll method can be ensured. The interlayer film for a laminated glass may have the projections and recesses only on one surface. Preferably, the interlayer film for a laminated glass has the projections and recesses on both surfaces because deaeration properties are significantly improved.

In the interlayer film for a laminated glass of the present invention, the recesses, among the projections and recesses on at least one surface, each have a groove shape with a continuous bottom (i.e., "recesses in the shape of engraved lines") and are regularly adjacent to each other in parallel with one another. Commonly, ease of deaeration upon pressure bonding of a laminate including an interlayer film for a laminated glass interposed between two glass plates closely relates to the communication properties and smoothness of the bottoms of the recesses. By forming recesses of the projections and recesses on at least one surface of the interlayer film into the shape of engraved lines arranged in parallel with one another, the communication properties of the recesses are further enhanced to markedly increase the deaeration properties.

In the state "regularly adjacent to each other", the adjacent recesses in the shape of engraved lines may be adjacent to each other in parallel with one another at equal intervals. Alternatively, the adjacent recesses in the shape of engraved lines may be adjacent to each other in parallel with one another not necessarily at equal intervals between all the adjacent recesses. In addition, the recesses in the shape of engraved lines do not necessarily have a groove shape with a completely continuous bottom, and may have a partition wall in a part of the bottom. The grooves at the bottom do not necessarily have a straight line shape and may be in the shape of, for example, a wave or zigzag, as long as the recesses are regularly adjacent to each other in parallel with one another.

In the interlayer film for a laminated glass of the present invention, the recesses each having a groove shape with a continuous bottom has a ratio (R/Sm×100) of a radius of rotation R of the bottom to an interval Sm between the recesses of 15% or higher. Having such a structure, the interlayer film for a laminated glass can exhibit sufficient deaeration properties during preliminary pressure bonding in production of a laminated glass by the nip roll method. At the same time, the recesses in the shape of engraved lines can be crushed by pressure during the preliminary pressure bonding to prevent air from remaining in the recesses, leading to production of a transparent laminated glass with less air bubbles included therein.

The recesses each having a groove shape with a continuous bottom has a ratio (R/Sm×100) of a radius of rotation R of the bottom to an interval Sm between the recesses of preferably 20% or higher, more preferably 30% or higher, still more preferably 50% or higher. The recesses each having a groove shape with a continuous bottom has a ratio (R/Sm×100) of a radius of rotation R of the bottom to an interval Sm between the recesses of 200% or lower, more preferably 100% or lower.

The radius of rotation R of the bottom of the recess in the shape of an engraved line herein is measured as follows. The interlayer film for a laminated glass is cut with a single-edged razor (e.g., FAS-10 produced by FEATHER Safety Razor Co., Ltd.) in a direction perpendicular to the direction of the engraved lines of the recesses and parallel to the thickness direction of the film in such a manner that the cut plane is not deformed. Specifically, the razor is pushed out in a direction parallel to the thickness direction, without being slid in the direction perpendicular to the recesses. The cross section is observed using a microscope (e.g., "DSX-100" produced by Olympus Corporation) and photographed at a magnification of 208 times. The obtained image is enlarged to 50 µm/20 mm for analysis using measurement software included in accessory software. The radius of an inscribed circle in the bottom of the recess in the shape of an engraved line is determined as the radius of rotation R. The measurement is performed at 23° C. and 30 RH %. Five samples are taken at arbitrary five points in the interlayer film and the Rs are measured at three sites in each sample. The R is the average of the values measured at 15 sites in total.

The interval Sm between the recesses in the shape of engraved lines herein is defined in JIS B-0601(1994). The interval Sm between the recesses in the shape of engraved lines can be measured by observing a first surface and a second surface (observation range: 20 mm×20 mm) of the interlayer film for a laminated glass using an optical microscope ("BS-D8000III" produced by SONIC Corp.) to measure the interval between adjacent recesses and calculating the average of the shortest distances between the deepest bottoms of the observed adjacent recesses.

The lower limit of the radius of rotation R of the bottom of the recess in the shape of an engraved line is preferably 20 µm and the upper limit thereof is preferably 250 µm. With the radius of rotation R of the bottom of the recess in the shape of an engraved line within such a range, the recess in the shape of an engraved line is more readily crushed by pressure applied during preliminary pressure bonding and the interlayer film for a laminated glass can exhibit higher deaeration properties in production of a laminated glass by the nip roll method. The lower limit of the radius of rotation R of the bottom of the recess in the shape of an engraved line is more preferably 40 µm and the upper limit thereof is more preferably 125 µm.

The lower limit of the interval Sm between the recesses in the shape of engraved lines is preferably 50 µm, and the upper limit thereof is preferably 1000 µm. With the interval Sm of the recesses in the shape of engraved lines within such a range, the interlayer film for a laminated glass can exhibit higher deaeration properties during preliminary pressure bonding and the recesses in the shape of engraved lines are more readily crushed by the pressure of the preliminary pressure bonding in production of a laminated glass by the nip roll method. The lower limit of the interval Sm between the recesses in the shape of engraved lines is more preferably 100 µm, still more preferably 175 µm, and the upper limit thereof is more preferably 400 µm, still more preferably 300 µm. When the interval of the recesses in the shape of engraved lines is equal to or more than the lower limit, favorable deaeration properties can be exhibited even in the vacuum bag method.

The lower limit of the roughness (Rz) of the recesses in the shape of engraved lines is preferably 10 µm, and the upper limit thereof is preferably 80 µm. With the roughness (Rz) of the recesses in the shape of engraved lines within this range, excellent deaeration properties can be exhibited. The lower limit of the roughness (Rz) of the recesses in the shape of engraved lines is more preferably 20 µm, and the upper limit thereof is more preferably 65 µm. The upper limit is still more preferably 50 µm.

The roughness (Rz) of the recesses in the shape of engraved lines as used herein is defined in JIS B-0601 (1994), and is measured perpendicularly so as to transverse the direction in which the recess in the shape of an engraved line is continuous. The measurement device may be, for example, "Surfcorder SE300" available from Kosaka Laboratory Ltd. The measurement may be performed at a cut-off value of 2.5 mm, a standard length of 2.5 mm, a measurement length of 12.5 mm, a spare length of 2.5 mm, and a stylus feed rate of 0.5 mm/sec, with a stylus having a tip radius of 2 μm and a tip angle of 60°. The measurement is performed at 23° C. and 30 RH %. The interlayer film is allowed to stand in an environment of the measurement conditions for three hours or longer before the measurement.

In the interlayer film for a laminated glass of the present invention, the lower limit of the radius of rotation R' of the tip portion of the projection among the projections and recesses is preferably 15 μm. Such a radius of rotation R' increases the friction force between the glass plate and the interlayer film for a laminated glass, so that misalignment between the glass plate and the interlayer film for a laminated glass on the conveyor can be more effectively prevented in production of a laminated glass by the nip roll, method. The upper limit of the radius of rotation R' of the tip portion of the projection is not particularly limited, and is preferably 100 μm or less. Such a radius of rotation R' prevents adhesion of the interlayer films to each other even when they are stacked on each other, leading to better handleability. The lower limit of the radius of rotation R' of the tip portion of the projection is more preferably 30 μm, and the upper limit thereof is more preferably 80 μm.

The radius of rotation R' of the tip portion of the projection is measured as follows. The interlayer film is cut in a direction perpendicular to the direction of the engraved lines of the recesses and in the thickness direction of the film. The cross section is observed using a microscope (e.g., "DSX-100" produced by Olympus Corporation) and photographed at a magnification of 555 times. The obtained image is enlarged to 50 μm/20 mm for analysis using measurement software included in accessory software. The radius of an inscribed circle at the apex of the projection is determined as the radius of rotation R'. The measurement is performed at 23° C. and 30 RH %.

The interlayer film for a laminated glass of the present invention preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. Preferred among these are polyvinyl acetal and ethylene-vinyl acetate copolymers, and more preferred is polyvinyl acetal.

The polyvinyl acetal can be prepared, for example, by acetalization of polyvinyl alcohol (PVA) with an aldehyde. The polyvinyl acetal is preferably an acetalization product of polyvinyl alcohol. The PVA commonly has a degree of saponification within a range of 70 to 99.9 mol %.

The PVA to be used for preparing the polyvinyl acetal has a degree of polymerization of preferably 200 or more, more preferably 500 or more, still more preferably 1700 or more, particularly preferably 2000 or more, and preferably 5000 or less, more preferably 4000 or less, still more preferably 3000 or less, furthermore preferably less than 3000, particularly preferably 2800 or less. The polyvinyl acetal is preferably a polyvinyl acetal prepared by acetalization of PVA having a degree of polymerization that satisfies the above lower limit and upper limit. When the degree of polymerization is equal to or more than the lower limit, a laminated glass to be obtained has higher penetration resistance. When the degree of polymerization is equal to or lower than the upper limit, formation of an interlayer film is facilitated.

The degree of polymerization of PVA refers to the average degree of polymerization. The average degree of polymerization can be obtained by the method in conformity with JIS K6726 "Testing methods for polyvinyl alcohol". Commonly, the aldehyde is preferably a C1-C10 aldehyde. Examples of the C1-C10 aldehyde include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The polyvinyl acetal is preferably polyvinyl butyral. The use of polyvinyl butyral further increases the weather resistance or like properties of the interlayer film relative to a laminated glass member.

The interlayer film for a laminated glass of the present invention preferably contains a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the interlayer film for a laminated glass of the present invention contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The interlayer film for a laminated glass of the present invention preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid.

The interlayer film for a laminated glass of the present invention may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The interlayer film for a laminated glass of the present invention preferably has a glossiness of 35% or lower.

The glossiness as used herein means the 75° specular gloss measured in conformity with JIS Z 8741:1997 using a precision gloss meter (e.g., "GM-26PRO" produced by Murakami Color Research Laboratory). When the interlayer film has a glossiness of 35% or lower, the film have minute projections and recesses, which can suppress autohesion when the films are stacked on each other, leading to better handleability. The upper limit of the glossiness is more preferably 20% or lower, still more preferably 10% or lower. When the interlayer film has a glossiness of 3% or higher, minute projections and recesses on the film are prevented from remaining between the film and the glass plate after the preliminary pressure bonding, which can avoid residual air bubbles in the film after pressure bonding under heating in an autoclave.

The interlayer film for a laminated glass of the present invention having a multilayer structure may be, for example, an interlayer film for a laminated glass having excellent sound insulation properties (hereafter, also referred to as a "sound insulation interlayer film") which includes the first resin layers as protective layers and the second resin layer as a sound insulation layer interposed between two protective layers with an aim of improving the sound insulation properties.

The sound insulation interlayer film is more specifically described in the following.

In the sound insulation interlayer film, the sound insulation layer provides sound insulation properties.

The sound insulation layer preferably contains polyvinyl acetal X and a plasticizer.

The polyvinyl acetal X can be prepared by acetalization of polyvinyl alcohol with an aldehyde. The polyvinyl acetal X is preferably an acetalization product of polyvinyl alcohol. The polyvinyl alcohol is commonly obtained by saponifying polyvinyl acetate.

The lower limit of the degree of polymerization of the polyvinyl alcohol is preferably 200, and the upper limit thereof is preferably 5000. When the polyvinyl alcohol has a degree of polymerization of 200 or more, a sound insulation interlayer film to be obtained can have better penetration resistance. When the polyvinyl alcohol has a degree of polymerization of 5000 or less, formability of a sound insulation layer can be ensured. The lower limit is more preferably 500 and the upper limit is more preferably 4000.

The lower limit of the carbon number of the aldehyde used for acetalization of the polyvinyl alcohol is preferably 4, and the upper limit thereof is preferably 6. When the aldehyde has a carbon number of 4 or more, a sound insulation interlayer film for a laminated glass to be obtained can stably contain a sufficient amount of a plasticizer. As a result, the sound insulation interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity.

The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %.

The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 68 mol % or more because the sound insulation layer can readily contain a plasticizer in an amount needed for exhibiting sound insulation properties.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass. The plasticizer content of the sound insulation layer may be the plasticizer content before the production of a laminated glass or the plasticizer content after the production of a laminated glass. The plasticizer content after the production of a laminated glass can be measured by the following procedure. A produced laminated glass is allowed to stand at a temperature of 25° C. and a humidity of 30% for 4 weeks. Then, the laminated glass is cooled in liquid nitrogen to separate the glass plate from the interlayer film for a laminated glass. The resulting protective layers and sound insulation layer are cut in the thickness direction, and allowed to stand at a temperature of 25° C. and a humidity of 30% for 2 hours. The protective layer is peeled from the sound insulation layer using a finger or a device inserted between the protective layer and the sound insulation layer at a temperature of 25° C. and a humidity of 30%, thereby preparing 10 g of a rectangular sample for measurement of each of the protective layer and sound insulation layer. The plasticizer in the sample for measurement is extracted in diethyl ether using a Soxhlet extractor for 12 hours, and the amount of the plasticizer in the sample for measurement is determined, thereby obtaining the plasticizer contents of the protective layers and the intermediate layer.

The lower limit of the thickness of the sound insulation layer is preferably 50 μm. When the sound insulation layer has a thickness of 50 μm or more, the sound insulation layer can exhibit enough sound insulation properties. The lower limit of the thickness of the sound insulation layer is more preferably 70 μm, still more preferably 80 μm. The upper limit thereof is not particularly limited. In consideration of the thickness as an interlayer film for a laminated glass, the upper limit is preferably 150 μm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and polyvinyl acetal Y, more preferably a plasticizer and polyvinyl acetal Y having a larger hydroxy group content than polyvinyl acetal X.

The polyvinyl acetal Y can be prepared by acetalization of polyvinyl alcohol with an aldehyde. The polyvinyl acetal Y is preferably an acetalization product of polyvinyl alcohol.

The polyvinyl alcohol is commonly obtained by saponifying polyvinyl acetate. The lower limit of the degree of polymerization of the polyvinyl alcohol is preferably 200, and the upper limit thereof is preferably 5000. When the polyvinyl alcohol has a degree of polymerization of 200 or more, an interlayer film for a laminated glass to be obtained can have better penetration resistance. When the polyvinyl alcohol has a degree of polymerization of 5000 or less, formability of a protective layer can be ensured. Concerning the degree of polymerization of the polyvinyl alcohol, the lower limit is more preferably 500 and the upper limit is more preferably 4000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or less, whitening of an interlayer film for a laminated glass to be obtained can be prevented. When the polyvinyl acetal Y has a hydroxy group content of 28 mol % or more, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group content, acetal group content, and acetyl group content of the polyvinyl acetal Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably smaller than the plasticizer content of the sound insulation layer. The plasticizer content of the protective layer may be the plasticizer content before the production of a laminated glass or the plasticizer content after the production of a laminated glass. The plasticizer content after the production of a laminated glass may be measured by the same procedure as that for the sound insulation layer.

For higher sound insulation properties of a laminated glass to be obtained, the hydroxy group content of the polyvinyl acetal Y is preferably larger than the hydroxy group content of the polyvinyl acetal X, more preferably larger by 1 mol % or more, still more preferably larger by 5 mol % or more, particularly preferably larger by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content (hereafter, also referred to as content X) based on 100 parts by mass of the polyvinyl acetal X of the sound insulation layer is preferably larger than the plasticizer content (hereafter, also referred to as content Y) based on 100 parts by mass of the polyvinyl acetal Y of the protective layer, more preferably larger by 5 parts by mass or more, still more preferably larger by 15 parts by mass or more, particularly preferably larger by 20 parts by mass or more. Adjustment of the content X and content Y lowers the glass transition temperature of the sound insulation layer. As a result, a laminated glass to be obtained has still higher sound insulation properties.

The lower limit of the thickness of the protective layer is preferably 200 μm, and the upper limit thereof is preferably 1000 μm. When the protective layer has a thickness of 200 μm or more, the penetration resistance can be ensured.

The lower limit of the thickness of the protective layer is more preferably 300 μm, and the upper limit thereof is more preferably 700 μm.

The sound insulation interlayer film may be produced by any method. The sound insulation interlayer film can be produced, for example, by a method of forming the sound insulation layer and protective layer as sheet materials by a conventional film formation method such as extrusion, calendering, or pressing and then stacking the obtained sheet materials.

The interlayer film for a laminated glass of the present invention may be produced by any method, and a conventionally known method may be employed.

In the present invention, a large number of recesses and a large number of projections may be formed on at least one surface of the interlayer film for a laminated glass by, for example, an embossing roll method, calender roll method, profile extrusion method, or melt fracture method. Preferred among these is the embossing roll method.

The present invention further encompasses a laminated glass including a pair of glass plates and the interlayer film for a laminated glass of the present invention interposed between the pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Other examples of the glass plates include organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

The laminated glass of the present invention can be favorably produced by the nip roll method.

In the nip roll method, a laminate including at least two glass plates and an interlayer film for a laminated glass interposed between the glass plates is carried on a conveyor through a heating zone to be heated to a certain temperature, and then passed between nip rolls to be pressure bonded under heating, while the glass plates and the interlayer film are squeezed for reduction of air remaining therebetween. The laminate is thus closely bonded while air between the interlayer film and the glass plates is reduced.

When carried on a conveyor, the laminate is preferably placed in such a manner that the inclination of the recesses in the shape of engraved lines of the interlayer film for a laminated glass of the present invention is 55° or smaller relative to the machine direction. This can prevent misalignment between the glass and the interlayer film for a laminated glass of the laminate on the conveyor, achieving high production efficiency. The inclination of the recesses in the shape of engraved lines of the interlayer film for a laminated glass of the present invention when carried on a conveyor is more preferably 45° or smaller, still more preferably 25° or smaller relative to the machine direction.

Advantageous Effects of Invention

The present invention can provide an interlayer film for a laminated glass capable of exhibiting high deaeration properties even in a nip roll method and hardly forming air bubbles to enable the production of a highly visible laminated glass, and also provide a laminated glass including the interlayer film for a laminated glass.

DESCRIPTION OF EMBODIMENTS

Embodiments of the present invention are more specifically described in the following with reference to, but not limited to, examples.

Example 1

(1) Production of an Interlayer Film for a Laminated Glass

Polyvinyl alcohol having an average degree of polymerization of 1700 was acetalized with n-butyraldehyde to give a polyvinyl butyral (acetyl group content: 1 mol %, butyral group content: 69 mol %, hydroxy group content: 30 mol %). To 100 parts by weight of the polyvinyl butyral were added 40 parts by weight of triethylene glycol-di-2-ethylhexanoate (3GO) as a plasticizer and a mixture of magnesium bis(2-ethylbutyrate) (50% by mass) and magnesium acetate (50% by mass) as an adhesion modifier such that the magnesium concentration in the film became 50 ppm. The mixture was kneaded sufficiently with a mixing roll to give a resin composition.

The resin composition was extruded using an extruder to provide a single-layer interlayer film for a laminated glass having a thickness of 760 μm.

In the first step, a random pattern of projections and recesses was transferred to both surfaces of the resulting interlayer film for a laminated glass by the following process. First, random projections and recesses were formed on a pair of iron rolls with an abrasive material, and the iron rolls were subjected to vertical grinding. Finer projections and recesses were further formed on planar portions after the grinding with a finer abrasive material. In this manner, a pair of rolls in the same shape having a coarse main embossed pattern and a fine sub-embossed pattern were obtained. The pair of rolls was used as a device for transferring a pattern of projections and recesses to transfer a random pattern of projections and recesses to both faces of the obtained interlayer film for a laminated glass. The transferring conditions employed here were a temperature of the interlayer film for a laminated glass of 80° C., a temperature of the rolls of 145° C., a linear velocity of 10 m/min, and a linear pressure of 10 to 200 kN/m.

In the second step, projections and recesses in which recesses each had a groove shape with a continuous bottom (shape of an engraved line) and were regularly adjacent to each other in parallel with one another at equal intervals were imparted to one surface of the interlayer film for a laminated glass by passing the obtained interlayer film for a laminated glass between a pair of rolls as a device for transferring a pattern of projections and recesses. The pair of rolls included a metal roll having a surface milled with a triangular oblique line-type mill and a rubber roll having a JIS hardness of 65 to 75. The transferring conditions employed here were a temperature of the interlayer film for a laminated glass of 70° C., a temperature of the rolls of 145° C., a linear velocity of 10 m/min, and a linear pressure of 5 to 100 kN/m. As a result of the measurement of the thickness of the film after the formation of the engraved lines, the thickness in the width direction and the machine direction was 760 μm, and a difference between the maximum thickness and the minimum thickness was 25 μm. The thickness profile was divided in the measurement direction to 15-cm sections, and the difference between the maximum thickness and the minimum thickness was recorded for each section. The difference in the thickness in the section where the difference was largest was 10 μm.

(2) Evaluation of Projections and Recesses of Interlayer Film for a Laminated Glass The interval Sm of the recesses in the shape of engraved lines, the radius of rotation R, and the roughness Rz of the recesses in the shape of engraved lines on the surface of the obtained interlayer film for a laminated glass were measured by the method in conformity with JIS B-0601(1994). The measurement was performed in the direction perpendicular to the engraved lines at a cut-off value of 2.5 mm, a standard length of 2.5 mm, an evaluation length of 12.5 mm, and a measurement rate of 0.5 mm/s, with a stylus having a tip radius of 2 μm and a tip angle of 60°.

The interval of the recesses in the shape of engraved lines was determined as follows. The surface of the interlayer film for a laminated glass was observed at five sites (observation range: 20 mm×20 mm) with an optical microscope ("BS-D8000III" produced by SONIC Corp.) for measurement of the interval of the adjacent recesses, and the average shortest distance between deepest bottoms of adjacent recesses was calculated.

The interlayer film for a laminated glass was cut with a single-edged razor (e.g., FAS-10 produced by FEATHER Safety Razor Co., Ltd.) in a direction perpendicular to the direction of the engraved lines of the recesses and parallel to the thickness direction of the film in such a manner that the cut plane was not deformed. Specifically, the razor was pushed out in a direction parallel to the thickness direction, without being slid in the direction perpendicular to the recesses. The cross section was observed using a microscope ("DSX-100" produced by Olympus Corporation). The cross section was photographed at a magnification of 208 times, and the obtained image was enlarged to 50 μm/20 mm for determining the radius of an inscribed circle (i.e., radius of rotation R) in the bottom of a recess in the shape of an engraved line. The Rz of the film surface after the first step was 15 μm.

Table 1 shows the measurement values in relation to the projections and recesses on the front surface and the rear surface of the interlayer film for a laminated glass.

Examples 2 to 13, Comparative Examples 1 to 4

An interlayer film for a laminated glass was produced as in Example 1, except that the acetyl group content, butyral group content, and hydroxy group content of the polyvinyl butyral used were changed as shown in Tables 1 and 2 and the shape of projections and recesses to be imparted was changed by changing the shape of the embossing rolls in the first step and the triangular oblique line-type roll. Tables 1 and 2 show the measurement values in relation to the projections and recesses on the front surface and the rear surface of each of the interlayer films for a laminated glass obtained in the examples and comparative examples.

Example 14

(Preparation of a Resin Composition for Protective Layers)

To 100 parts by weight of a polyvinyl butyral resin (hydroxy group content: 30 mol %, degree of acetylation: 1 mol %, degree of butyralization: 69 mol %, average degree of polymerization: 1700) were added 36 parts by weight of triethylene glycol-di-2-ethylhexanoate (3GO) as a plasticizer and a mixture of magnesium bis(2-ethylbutyrate) (50% by mass) and magnesium acetate (50% by mass) as an adhesion modifier such that the magnesium concentration in the film became 50 ppm. The mixture was kneaded sufficiently with a mixing roll to give a resin composition for protective layers.

(Preparation of Resin Composition for Sound Insulation Layers)

To 100 parts by weight of a polyvinyl butyral resin (hydroxy group content: 23.5 mol %, degree of acetylation: 12.5 mol %, degree of butyralization: 64 mol %, average degree of polymerization: 2300) were added 76.5 parts by weight of triethylene glycol-di-2-ethylhexanoate (3GO) as a plasticizer, and kneaded sufficiently with a mixing roll to give a resin composition for sound insulation layers.

(Production of an Interlayer Film for a Laminated Glass)

The resin composition for sound insulation layers and the resin composition for protective layers were co-extruded to form an interlayer film for a laminated glass (width: 100 cm) having a triple layer structure including a protective layer (thickness: 350 μm), a sound insulation layer (thickness: 100 μm), and a protective layer (thickness: 350 μm) stacked in the stated order in the thickness direction.

In the first step, a random pattern of projections and recesses was transferred to both surfaces of the resulting interlayer film for a laminated glass by the following process. First, random projections and recesses were formed on a pair of iron rolls with an abrasive material, and the iron rolls were subjected to vertical grinding. Finer projections and recesses were further formed on planar portions after the grinding with a finer abrasive material. In this manner, a pair of rolls in the same shape having a coarse main embossed pattern and a fine sub-embossed pattern were obtained. The pair of rolls was used as a device for transferring a pattern of projections and recesses to transfer a random pattern of projections and recesses to both faces of the obtained interlayer film for a laminated glass. The transferring conditions employed here were a temperature of the interlayer film for a laminated glass of 80° C., a temperature of the rolls of 145° C., a linear velocity of 10 m/min, and a linear pressure of 10 to 200 kN/m.

In the second step, projections and recesses in which recesses each had a groove shape with a continuous bottom (shape of an engraved line) and were regularly adjacent to each other in parallel with one another at equal intervals were imparted to one surface of the interlayer film for a laminated glass by passing the obtained interlayer film for a laminated glass between a pair of rolls as a device for transferring a pattern of projections and recesses. The pair of rolls included a metal roll having a surface milled with a triangular oblique line-type mill and a rubber roll having a JIS hardness of 65 to 75. The transferring conditions employed here were a temperature of the interlayer film for a laminated glass of 70° C., a temperature of the rolls of 145° C., a linear velocity of 10 m/min, and a linear pressure of 5 to 100 kN/m. As a result of the measurement of the thickness of the film after the formation of the engraved lines, the thickness in the width direction and the machine direction was 800 μm, and a difference between the maximum thickness and the minimum thickness was 25 μm. The thickness profile was divided in the measurement direction to 15-cm sections, and the difference between the maximum thickness and the minimum thickness was recorded for each section. The difference in the thickness in the section where the difference was largest was 10 μm.

(2) Evaluation of Projections and Recesses of Interlayer Film for a Laminated Glass The interval Sm of the recesses in the shape of engraved lines, the radius of rotation R, and the roughness Rz of the recesses in the shape of engraved lines on the surface of the obtained interlayer film for a laminated glass were measured by the method in conformity with JIS B-0601(1994). The measurement was performed in the direction perpendicular to the engraved lines at a cut-off value of 2.5 mm, a standard length of 2.5 mm, an evaluation length of 12.5 mm, and a measurement rate of 0.5 mm/s, with a stylus having a tip radius of 2 μm and a tip angle of 60°.

The interval of the recesses in the shape of engraved lines was determined as follows. The surface of the interlayer film for a laminated glass was observed at five sites (observation range: 20 mm×20 mm) with an optical microscope ("BS-D8000III" produced by SONIC Corp.) for measurement of the interval of the adjacent recesses, and the average shortest distance between deepest bottoms of adjacent recesses was calculated.

The interlayer film for a laminated glass was cut with a single-edged razor (e.g., FAS-10 produced by FEATHER Safety Razor Co., Ltd.) in a direction perpendicular to the recesses in the shape of engraved lines and parallel to the thickness direction of the film in such a manner that the cut plane was not deformed. Specifically, the razor was pushed out in a direction parallel to the thickness direction, without being slid in the direction perpendicular to the recesses. The cross section was observed using a microscope ("DSX-100" produced by Olympus Corporation). The cross section was photographed at a magnification of 208 times, and the obtained image was enlarged to 50 μm/20 mm for determining the radius of an inscribed circle (i.e., radius of rotation R) in the bottom of a recess in the shape of an engraved line. The Rz of the film surface after the first step was 15 μm.

Table 3 shows the measurement values in relation to the projections and recesses on the front surface and the rear surface of the interlayer film for a laminated glass.

(3) Measurement of Plasticizer Content

A laminated glass after the production was allowed to stand at a temperature of 25° C. and a humidity of 30% for 4 weeks. Then, the laminated glass was cooled in liquid nitrogen to separate the glass plate from the interlayer film for a laminated glass. The resulting protective layers and sound insulation layer were cut in the thickness direction, and allowed to stand at a temperature of 25° C. and a humidity of 30% for 2 hours. The protective layer was peeled from the sound insulation layer using a finger or a device inserted between the protective layer and the sound insulation layer at a temperature of 25° C. and a humidity of 30%, thereby preparing 10 g of a rectangular sample for measurement of each of the protective layer and sound insulation layer. The plasticizer in the sample for measurement was extracted in diethyl ether using a Soxhlet extractor for 12 hours, and the amount of the plasticizer in the sample for measurement was determined, thereby obtaining the plasticizer contents of the protective layer and the intermediate layer.

Examples 15 to 22, Comparative Examples 5 to 7

An interlayer film for a laminated glass was produced as in Example 14, except that the acetyl group content, butyral group content, and hydroxy group content of the polyvinyl butyral used were changed as shown in Table 3 and the shape of projections and recesses to be imparted was changed by changing the shape of the embossing rolls in the first step and the triangular oblique line-type roll. Table 3 shows the measurement values in relation to the projections and recesses on the front surface and the rear surface of each of the interlayer films for a laminated glass obtained in the examples and comparative examples.

(Evaluation)

The interlayer films for a laminated glass obtained in the examples and the comparative examples were evaluated by the following methods.

Tables 1, 2, and 3 show the results.

<Evaluation in Nip Roll Method>

(1) Evaluation of Embossed Pattern Remaining after Preliminary Pressure Bonding

Each of the interlayer films for a laminated glass obtained in the examples and comparative examples was allowed to stand at 23° C. and 30 RH % for five hours, and then subjected to the following operations.

The interlayer film for a laminated glass was interposed between two transparent glass plates (15 cm in length×30 cm in width×2.5 mm in thickness) to give a laminate. The laminate was primarily deaerated using first nip rolls (roll pressure: 2 kgf/cm²). The resulting laminate was carried on a roller conveyor through an infrared oven to be heated until the surface temperature reached 50° C. Then, the laminate was secondarily deaerated using second nip rolls (roll pressure: 4 kgf/cm²).

The obtained laminate was further carried on the roller conveyor through the infrared oven to be heated until the glass surface temperature reached 85° C. Then, the laminate was passed between third nip rolls (roll pressure: 4 kgf/cm²) to be squeezed for removal of air remaining between the glass plates and the interlayer film (tertiary deaeration). The preliminary pressure bonding was thus completed. The gap between nip rolls in each step was set to be narrower than the thickness of the laminate by 1 mm, and the circumferential velocity of the nip rolls was set to 5 m/min. Tables 1, 2, and 3 show the angle between the recesses in the shape of engraved lines formed on the surface of the interlayer film for a laminated glass and the machine direction of the conveyor.

The laminate after the preliminary pressure bonding was sufficiently cooled in liquid nitrogen so that the glass plate was separated from the interlayer film without leaving any glass pieces on the surface of the film. The interlayer film sheet was thus obtained. The obtained interlayer film sheet was allowed to stand at 23° C. and 30 RH % for one hour, and the residual embossed pattern on its surface was analyzed using a three-dimensional surface profilometer (Contour GT-K produced by Bulker AXS). The analysis of the embossed pattern using a three-dimensional surface profilometer was carried out within 24 hours.

The measurement was performed at 20 sites in a region of between 10 cm and 20 cm away from the leading end of the glass plate in the machine direction of the roller conveyor and 3 cm away from each side edge of the glass plate. Each measuring site had an area of 1.3 mm×1.3 mm.

Based on the obtained three-dimensional shape, the volume of the remaining grooves was measured using "Multivision analysis", accessory analysis software of the three-dimensional surface profilometer. The peeled surface of the film peeled from the glass plate was taken as the reference surface for calculation of the volume, while setting the Multivision analysis conditions. Specifically, the "Zerolevel" condition was set to "Background" and the value of "By threshold" was appropriately adjusted.

The average volume of the grooves per unit area was calculated. The case where the average of 20 measured average volumes of the grooves was more than 1.5 μm³/μm² (=μm) was rated "Poor (×)". The case where the average was 1.0 μm³/μm² (=μm) or more but not more than 1.5 μm³/μm² (=μm) was rated "Good (○)". The case where the average was less than 1.0 μm³/μm² (=μm) was rated "Excellent (○○)". The average volume of the grooves refers to the average of the volumes of the grooves on the front surface and the rear surface in the same measurement site.

(2) Evaluation of Foaming in a Laminated Glass (Condition 1)

The interlayer films for a laminated glass obtained in the examples and comparative examples were each allowed to stand at 23° C. and 30 RH % for five hours, and then subjected to the following operations.

The interlayer film for a laminated glass was interposed between two transparent glass plates (15 cm in length×30 cm in width×2.5 mm in thickness) to give a laminate. The laminate was primarily deaerated using first nip rolls (roll pressure: 2 kgf/cm²). The resulting laminate was carried on a roller conveyor through an infrared oven to be heated until the surface temperature reached 50° C. Then, the laminate was secondarily deaerated using second nip rolls (roll pressure: 4 kgf/cm²).

The obtained laminate was further carried on the roller conveyor through the infrared oven to be heated until the glass surface temperature reached 85° C. Then, the laminate was passed between third nip rolls (roll pressure: 4 kgf/cm²) to be squeezed for removal of air remaining between the glass plates and the interlayer film (tertiary deaeration). The preliminary pressure bonding was thus completed. The gap between nip rolls in each step was set to be narrower than the thickness of the laminate by 1 mm, and the circumferential velocity of the nip rolls was set to 5 m/min. Tables 1, 2, and 3 show the angle between the recesses in the shape of engraved lines formed on the surface of the interlayer film for a laminated glass and the machine direction of the conveyor.

(3) Evaluation of Foaming in a Laminated Glass (Condition 2)

The interlayer films for a laminated glass obtained in the examples and comparative examples were each allowed to stand at 23° C. and 30 RH % for five hours, and then subjected to the following operations.

The interlayer film for a laminated glass was interposed between two transparent glass plates (15 cm in length×30 cm in width×2.5 mm in thickness) to give a laminate. The laminate was primarily deaerated using first nip rolls (roll pressure: 2 kgf/cm²). The resulting laminate was carried on a roller conveyor through an infrared oven to be heated until the surface temperature reached 70° C. Then, the laminate was secondarily deaerated using second nip rolls (roll pressure: 4 kgf/cm²).

The gap between nip rolls in each step was set to be narrower than the thickness of the laminate by 1 mm, and the circumferential velocity of the nip rolls was set to 5 m/min. Tables 1, 2, and 3 show the angle between the recesses in the shape of engraved lines formed on the surface of the interlayer film for a laminated glass and the machine direction of the conveyor.

(4) Evaluation of Foaming in a Laminated Glass (Condition 3)

The interlayer films for a laminated glass obtained in the examples and comparative examples were each allowed to stand at 23° C. and 30 RH % for five hours, and then subjected to the following operations.

The interlayer film for a laminated glass was interposed between two transparent glass plates (15 cm in length×30 cm in width×2.5 mm in thickness) to give a laminate. The laminate was primarily deaerated using first nip rolls (roll pressure: 2 kgf/cm²). The resulting laminate was carried on a roller conveyor through an infrared oven to be heated until the surface temperature reached 60° C. Then, the laminate was secondarily deaerated using second nip rolls (roll pressure: 4 kgf/cm²). The gap between nip rolls in each step was set to be narrower than the thickness of the laminate by 1 mm, and the circumferential velocity of the nip rolls was set to 5 m/min. Tables 1, 2, and 3 show the angle between the recesses in the shape of engraved lines formed on the surface of the interlayer film for a laminated glass and the machine direction of the conveyor.

The laminates obtained by the conditions 1 to 3 in the evaluation of foaming in a laminated glass were each held in an autoclave at a chamber pressure of 13 atm and a chamber temperature of 140° C. for 20 minutes, and then cooled until the chamber temperature reached 40° C., followed by depressurization of the chamber to 1 atm. A laminated glass was thus produced.

The laminated glass was stored in an oven at 140° C. for two hours and taken out from the oven for cooling for three hours. Then, the appearance of the laminated glass was visually observed. The number of laminated glass sheets in which foaming (air bubbles) occurred between the glass plates and the interlayer film for a laminated glass in a region of at least 1 cm away from the glass edge, out of 20 laminated glass sheets was determined for each condition. The case where the number of laminated glass sheets with foaming was 5 or less was rated "Good (○)". The case where the number of laminated glass sheets with foaming was 6 or more was rated "Poor (×)".

<Evaluation in Vacuum Deaeration Method>
(Evaluation of Deaeration Properties after Preliminary Pressure Bonding by Vacuum Bag Method)

The obtained interlayer film for a laminated glass was interposed between two transparent glass plates (15 cm in length×15 cm in width×2.5 mm in thickness) and the portions of the film protruding from the glass plates were cut off, thereby preparing a laminate. The obtained laminate was preliminarily heated in an oven until the glass surface temperature reached 50° C. The resulting laminate was placed in a rubber bag, which was then connected to a vacuum suction device. The rubber bag was heated so that the temperature of the laminate (preliminary pressure bonding temperature) reached 90° C. in 18 minutes, while being held under a reduced pressure of −600 mmHg. Thereafter, the pressure was returned to atmospheric pressure, whereby the preliminary pressure bonding was completed. A preliminarily pressure-bonded laminate was thus obtained.

The collimated light transmittance of the obtained preliminarily pressure-bonded laminate was evaluated.

Specifically, the collimated light transmittance Tp (%) of the preliminarily pressure-bonded laminate was measured with a haze meter (HM-150 produced by Murakami Color Research Laboratory) in conformity with JIS K 7105.

The collimated light transmittance was measured at five measurement points in total including the intersection of two diagonals of the preliminarily pressure-bonded laminate and four points at 5.6 cm away in the diagonal direction from the apexes of the preliminary pressure-bonded laminate, and the average of the measured values was taken as the Tp.

Before the measurement, the laminate was cut to the size including the above measurement points at the center and within a range that the measured values are not affected, and was used as a sample for measurement.

Reduction in transparency of the laminated glass is caused by defective deaeration during preliminary pressure bonding. Accordingly, the deaeration properties of the interlayer film for a laminated glass can be evaluated more precisely by measurement of the visible light transmittance of the preliminarily deaerated laminate than analysis of foaming in the laminated glass.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Composition | Bu degree (mol %) | 69 | 69 | 69 | 69 | 69 | 69 | 69 | 69.9 | 68.2 | 69 |
| | OH degree (mol %) | 30 | 30 | 30 | 30 | 30 | 30 | 30 | 29 | 31 | 30 |
| | Ac degree (mol %) | 1 | 1 | 1 | 1 | 1 | 1 | 1 | 1.1 | 0.8 | 1 |
| | Parts of plasticizer (phr) | 40 | 40 | 40 | 40 | 40 | 40 | 40 | 41 | 39 | 40 |
| Shape of projections and recesses on front surface of interlayer film | Interval Sm of recesses in the shape of engraved lines (μm) | 210 | 300 | 211 | 212 | 215 | 210 | 300 | 201 | 210 | 150 |
| | Radius of rotation R of recesses in the shape of engraved lines (μm) | 65 | 180 | 69 | 48 | 66 | 65 | 175 | 40 | 38 | 30 |
| | R/Sm × 100 (%) | 31.0 | 60.0 | 32.7 | 22.6 | 30.7 | 31.0 | 58.3 | 19.9 | 18.1 | 20.0 |
| | Roughness Rz of recesses in the shape of engraved lines (μm) | 55 | 34 | 43 | 43 | 31.4 | 48 | 33 | 45 | 40 | 35 |
| | Angle of engraved lines relative to machine direction (°) | 45 | 10 | 55 | 55 | 55 | 55 | 10 | 55 | 55 | 45 |
| Shape of projections and recesses on rear surface of interlayer film | Interval Sm of recesses in the shape of engraved lines (μm) | 210 | 400 | 224 | 225 | 227 | 221 | 300 | 197 | 195 | 153 |
| | Radius of rotation R of recesses in the shape of engraved lines (μm) | 50 | 73 | 71 | 40 | 60 | 65 | 183 | 43 | 48 | 28 |
| | R/Sm × 100 (%) | 23.8 | 18.3 | 31.7 | 17.8 | 26.4 | 29.4 | 61.0 | 21.8 | 24.6 | 18.3 |
| | Roughness Rz of recesses in the shape of engraved lines (μm) | 50 | 33 | 42 | 56 | 36.2 | 63 | 30 | 46 | 38 | 38 |
| | Angle of engraved lines relative to machine direction (°) | −45 | −10 | 35 | 35 | 35 | 35 | −10 | 35 | 35 | −45 |
| Evaluation in nip roll method | Average volume of grooves after preliminary pressure bonding μm³/μm² | 1.3 | 0.6 | 1.2 | 1.4 | 1.1 | 1.3 | 0.3 | 1.3 | 1.3 | 1 |
| | Rating | ○ | ○○ | ○ | ○ | ○ | ○ | ○○ | ○ | ○ | ○ |
| | Evaluation of foaming in laminated glass — Test condition 1 | ○ | ○ | ○ | ○ | ○ | ○ | ○ | ○ | ○ | ○ |
| | Test condition 2 | ○ | ○ | ○ | X | ○ | X | ○ | X | X | X |
| | Test condition 3 | X | ○ | X | X | X | X | ○ | X | X | X |
| Evaluation in vacuum deaeration method | Collimated light transmittance Tp of preliminary pressure-bonded laminate (%) | 55 | 35 | 45 | 71 | 44 | 58 | 33 | 60 | 68 | 68 |

TABLE 2

| | | Example 11 | Example 12 | Example 13 | Comparative Example 1 | Comparative Example 2 | Comparative Example 3 | Comparative Example 4 |
|---|---|---|---|---|---|---|---|---|
| Composition | Bu degree (mol %) | 69 | 69 | 69 | 69 | 69 | 69 | 69 |
| | OH degree (mol %) | 30 | 30 | 30 | 30 | 30 | 30 | 30 |
| | Ac degree (mol %) | 1 | 1 | 1 | 1 | 1 | 1 | 1 |
| | Parts of plasticizer (phr) | 40 | 40 | 40 | 40 | 40 | 40 | 40 |
| Shape of projections and recesses on front surface of interlayer film | Interval Sm of recesses in the shape of engraved lines (μm) | 120 | 150 | 198 | 200 | 207 | 215 | 215 |
| | Radius of rotation R of recesses in the shape of engraved lines (μm) | 30 | 24 | 140 | 12 | 12 | 11 | 24 |
| | R/Sm × 100 (%) | 25.0 | 16.0 | 70.7 | 6.0 | 5.8 | 5.1 | 11.2 |
| | Roughness Rz of recesses in the shape of engraved lines (μm) | 25 | 30 | 23 | 55 | 41 | 35 | 45 |
| | Angle of engraved lines relative to machine direction (°) | 45 | 45 | 10 | 55 | 55 | 55 | 55 |
| Shape of projections and recesses on rear surface of interlayer film | Interval Sm of recesses in the shape of engraved lines (μm) | 125 | 153 | 190 | 197 | 225 | 227 | 220 |
| | Radius of rotation R of recesses in the shape of engraved lines (μm) | 45 | 24 | 133 | 10 | 20 | 9 | 27 |
| | R/Sm × 100 (%) | 36.0 | 15.7 | 70.0 | 5.1 | 8.9 | 4.0 | 12.3 |
| | Roughness Rz of recesses in the shape of engraved lines (μm) | 24 | 31 | 24 | 60 | 45 | 35 | 44 |
| | Angle of engraved lines relative to machine direction (°) | −45 | −45 | −10 | 35 | 35 | 35 | 35 |

TABLE 2-continued

|  |  |  | Example 11 | Example 12 | Example 13 | Comparative Example 1 | Comparative Example 2 | Comparative Example 3 | Comparative Example 4 |
|---|---|---|---|---|---|---|---|---|---|
| Evaluation in nip roll method | Average volume of grooves after preliminary pressure bonding | μm³/μm² | 0.8 | 1 | 0.4 | 1.8 | 1.5 | 1 | 1.5 |
|  |  | Rating | ◯◯ | ◯ | ◯◯ | X | ◯ | ◯ | ◯ |
|  | Evaluation of foaming in laminated glass | Test condition 1 | ◯ | ◯ | ◯ | X | X | X | X |
|  |  | Test condition 2 | ◯ | X | ◯ | X | X | X | X |
|  |  | Test condition 3 | X | X | ◯ | X | X | X | X |
| Evaluation in vacuum deaeration method | Collimated light transmittance Tp of preliminary pressure-bonded laminate (%) |  | 54 | 66 | 28 | 70 | 71 | 67 | 60 |

TABLE 3

|  |  | Example 14 | Example 15 | Example 16 | Example 17 | Example 18 | Example 19 | Example 20 | Example 21 | Example 22 | Comparative Example 5 | Comparative Example 6 | Comparative Example 7 |
|---|---|---|---|---|---|---|---|---|---|---|---|---|---|
| Composition of protective layer | Bu degree (mol %) | 69 | 69 | 69 | 69.9 | 68.5 | 69 | 69 | 69 | 69 | 69 | 69 | 69 |
|  | OH degree (mol %) | 30 | 30 | 30 | 29 | 31 | 30 | 30 | 30 | 30 | 30 | 30 | 30 |
|  | Ac degree (mol %) | 1 | 1 | 1 | 1.1 | 0.5 | 1 | 1 | 1 | 1 | 1 | 1 | 1 |
|  | Parts of plasticizer (phr) | 36 | 36 | 36 | 39 | 36 | 36 | 36 | 36 | 36 | 36 | 36 | 36 |
| Composition of sound insulation layer | Bu degree (mol %) | 64 | 64 | 64 | 77.8 | 67 | 64 | 64 | 64 | 64 | 64 | 64 | 64 |
|  | OH degree (mol %) | 23.5 | 23.5 | 23.5 | 20.7 | 25 | 23.5 | 23.5 | 23.5 | 23.5 | 23.5 | 23.5 | 23.5 |
|  | Ac degree (mol %) | 12.5 | 12.5 | 12.5 | 1.5 | 8 | 12.5 | 12.5 | 12.5 | 12.5 | 12.5 | 12.5 | 12.5 |
|  | Parts of plasticizer (phr) | 76.5 | 76.5 | 76.5 | 79.2 | 75 | 76.5 | 76.5 | 76.5 | 76.5 | 76.5 | 76.5 | 76.5 |
| Shape of projections and recesses on front surface of interlayer film | Interval Sm of recesses in the shape of engraved lines (μm) | 210 | 310 | 210 | 200 | 198 | 200 | 155 | 125 | 200 | 200 | 200 | 198 |
|  | Radius of rotation R of recesses in the shape of engraved lines (μm) | 63 | 175 | 48 | 42 | 35 | 66 | 28 | 30 | 138 | 12 | 11 | 20 |
|  | R/Sm × 100 (%) | 30.0 | 56.5 | 22.9 | 21.0 | 17.7 | 33.0 | 18.1 | 24.0 | 69.0 | 6.0 | 5.5 | 10.1 |
|  | Roughness Rz of recesses in the shape of engraved lines (μm) | 53 | 35 | 44 | 44 | 42 | 48 | 35 | 25 | 26 | 53 | 35 | 43 |
|  | Angle of engraved lines relative to machine direction (°) | 45 | 10 | 55 | 55 | 55 | 55 | 45 | 45 | 10 | 55 | 55 | 55 |
| Shape of projections and recesses on rear surface of interlayer film | Interval Sm of recesses in the shape of engraved lines (μm) | 210 | 389 | 220 | 195 | 192 | 210 | 154 | 124 | 195 | 197 | 197 | 190 |
|  | Radius of rotation R of recesses in the shape of engraved lines (μm) | 48 | 74 | 38 | 42 | 40 | 63 | 25 | 43 | 130 | 10 | 9 | 27 |
|  | R/Sm × 100 (%) | 22.9 | 19.0 | 17.3 | 21.5 | 20.8 | 30.0 | 16.2 | 34.7 | 66.7 | 5.1 | 4.6 | 14.2 |
|  | Roughness Rz of recesses in the shape of engraved lines (μm) | 48 | 35 | 54 | 45 | 38 | 50 | 38 | 26 | 26 | 52 | 35 | 45 |
|  | Angle of engraved lines relative to machine direction (°) | −45 | −10 | 35 | 35 | 35 | 35 | −45 | −45 | −10 | 35 | 35 | 35 |
| Evaluation in nip roll method | Average volume of grooves after preliminary pressure bonding μm³/μm² | 1.2 | 0.3 | 1.4 | 1.2 | 1.2 | 1.2 | 1.1 | 0.9 | 0.4 | 1.8 | 1 | 1.5 |
|  | Rating | ◯ | ◯◯ | ◯ | ◯ | ◯ | ◯ | ◯ | ◯◯ | ◯◯ | X | ◯ | ◯ |
|  | Evaluation of foaming in laminated glass Test condition 1 | ◯ | ◯ | ◯ | ◯ | ◯ | ◯ | ◯ | ◯ | ◯ | X | X | X |
|  | Test condition 2 | ◯ | ◯ | X | X | X | X | X | ◯ | ◯ | X | X | X |
|  | Test condition 3 | X | ◯ | X | X | X | X | X | X | ◯ | X | X | X |
| Evaluation in vacuum deaeration method | Collimated light transmittance Tp of preliminary pressure-bonded laminate (%) | 58 | 40 | 73 | 58 | 66 | 55 | 70 | 55 | 30 | 71 | 64 | 58 |

INDUSTRIAL APPLICABILITY

The present invention can provide an interlayer film for a laminated glass capable of exhibiting high deaeration properties even in a nip roll method and hardly forming air bubbles to enable the production of a highly visible laminated glass, and also can provide a laminated glass including the interlayer film for a laminated glass.

The invention claimed is:

1. An interlayer film for a laminated glass, having a large number of recesses and a large number of projections on at least one surface, the recesses each having a groove shape with a continuous bottom and being regularly adjacent to each other in parallel with one another, the recesses each having a groove shape with a continuous bottom having a ratio (R/Sm×100) of a radius of rotation R of the bottom to an interval Sm between the recesses of 15% or higher, and wherein the interval Sm between the recesses each having a groove shape with a continuous bottom is 300 μm or less.

2. The interlayer film for a laminated glass according to claim 1, wherein the recesses each having a groove shape with a continuous bottom have a radius of rotation R of the bottom of 20 to 250 μm.

3. The interlayer film for a laminated glass according to claim 2, wherein the interval Sm between the recesses each having a groove shape with a continuous bottom is 100 to 300 μm.

4. The interlayer film for a laminated glass according to claim 1, wherein the interval Sm between the recesses each having a groove shape with a continuous bottom is 100 to 300 μm.

5. A laminated glass, comprising:

a pair of glass plates; and the interlayer film for a laminated glass according to claim 1 interposed between the pair of glass plates.

6. A laminated glass, comprising:

a pair of glass plates; and the interlayer film for a laminated glass according to claim 2 interposed between the pair of glass plates.

7. A laminated glass, comprising:

a pair of glass plates; and the interlayer film for a laminated glass according to claim 3 interposed between the pair of glass plates.

8. A laminated glass, comprising:

a pair of glass plates; and the interlayer film for a laminated glass according to claim 4 interposed between the pair of glass plates.

* * * * *